United States Patent [19]

Murakami et al.

[11] Patent Number: 4,832,144
[45] Date of Patent: May 23, 1989

[54] POSITION DETECTOR

[75] Inventors: Azuma Murakami; Yoshinori Taguchi; Kenichi Takahashi; Takeshi Tanaka; Yoshiaki Tomofuji, all of Kuki, Japan

[73] Assignee: Kabushiki Kaisha WACOM, Saitama, Japan

[21] Appl. No.: 197,468

[22] Filed: May 23, 1988

[30] Foreign Application Priority Data

May 28, 1987 [JP] Japan .................................. 62-132316

[51] Int. Cl.$^4$ ............................................. G08C 21/00
[52] U.S. Cl. ...................................... 178/18; 324/208
[58] Field of Search ............................. 178/18, 19, 20; 324/207, 208; 367/128

[56] References Cited

U.S. PATENT DOCUMENTS 4,709,209 11/1987 Murakami et al. ................... 178/18

Primary Examiner—Stafford D. Schreyer
Attorney, Agent, or Firm—Price, Heneveld, Cooper, DeWitt & Litton

[57] ABSTRACT

A position detector comprising a plurality of magnetostriction propagating media extending substantially in parallel with one another and having first coils wound about the media at respective first ends thereof and second coils wound around the media over respective lengths thereof. A current pulse is applied to each of the first coils to generate magnetostrictive oscillation waves in the regions of the mediae around which the first coils are wound. The waves propagate through the media and cause an induced voltage to be generated in the respective second coils at the position where position indicators generate a steady magnetic field. The position of the position indicators is determined by measuring the time that elapses between generating the oscillating waves and receiving the induced voltages. Adjacent two of the plurality of magnetotriction propagating media are respectively paired and each of the magnetostriction propagating media of the respective pairs are individually wound with first coils that are connected together and second coils that are connected together so as to generate a magnetostrictive oscillating wave in the respective pairs. The plurality of magnetositriction propagating media may be evenly spaced or may be irregularly arranged with media that separate pairs being closer together than the media that comprise a pair. In one embodiment the current pulse is applied to the second coils to generate magnetostrictive oscillation waves at the position of the position indicators. In this embodiment the waves propagate through the mediae and cause an induced voltage to be generated in the respective first coil.

8 Claims, 10 Drawing Sheets

POSITION DETECTOR

FIELD OF THE INVENTION

The present invention relates to a position detector adapted to detect positions indicated by position indicators, utilizing a magnetostrictive oscillation wave propagated through magnetostriction media.

BACKGROUND OF THE INVENTION

An example of the well-known position detectors utilizing magnetostrictive oscillation wave propagated through the magnetostriction propagating media is schematically illustrated by FIG. 13 of the accompanying drawing. The illustrated position detector has been proposed by the applicant of the present application (Japanese Patent Application No. 1983-220071).

In this position detector of the prior art, a plurality of magnetostriction propagating media 1 of an amorphous alloy or the like containing a high percentage of iron each support a first coil 2 wound therearound at their one end and a second coil 4 wound therearound over their length for detection of the positions indicated by the position indicators $3p$, $3q$. The first coil 2 is connected to a pulse current generator 5 while the second coil 4 is connected to a processor 6. A biasing magnetic field generator 7 comprising a permanent magnet is provided in opposition to the end surfaces of magnetostriction propagating media 1, adjacent the portions of the respective magnetostriction propagating media around which said first coil 2 is wound.

First coil 2 is crossed between each pair of adjacent magnetostriction propagating media 1 and wound around each magnetostriction propagating medium 1 in the reverse direction with respect to the direction in which it is wound around the adjacent magnetostriction propagating medium 1. Each second coil 4 is wound around the respective magnetostriction propagating media 1 in the same direction and serially connected with adjacent second coils so that the connection polarity is successively reversed between adjacent second coils. Such arrangement is effective in reducing the unnecessary magnetic flux emitted external to the system. External noise is cancelled or reduced between said respective adjacent portions or coils because the direction of the magnetic flux generated when the direction of the voltage or the current generated in a coil, when the magnetic flux is reversed, is opposite from one portion or coil to the adjacent portion or coil so that the magnetic flux external to the system is reduced or cancelled.

Application of a pulse current from the pulse current generator 5 to the first coil 2 causes an instantaneous field variation in the first coil 2 and, thereby, a magnetostrictive oscillation wave to be generated in the region of the respective magnetostriction propagating media 1 around which the first coil 2 is wound. This magnetostrictive oscillation wave is propagated through the respective magnetostriction propagating media 1 longitudinally thereof at the propagating velocity specific to the magnetostriction propagating media 1. During this propagation, the conversion from mechanical energy to the corresponding magnetic energy occurs in the region of respective magnetostriction propagating media 1 in which the magnetostrictive oscillation wave exists according to the electromechanical coupling factor (i.e., the factor representing the conversion efficiency from mechanical energy to the corresponding electric energy or from the electric energy to the corresponding mechanical energy) specific to said region and, in consequence, an inductive voltage is generated in the respective second coil 4.

Assuming that a steady magnetic field exists in a region of magnetostriction propagating media 1, which is sufficient to increase the electromechanical coupling factor of this region, high inductive voltages are generated in the second coil 4 in the region when said magnetostrictive oscillation wave reaches said region. With a pair of position indicators $3p$, $3q$ generating such a steady magnetic field, respectively, in two regions, as shown by FIG. 13 two inductive voltage pulses $V_1$, $V_2$ corresponding to the positions indicated by the pair of position indicators $3p$, $3q$ are generated, as shown by FIG. 14. Detection of the positions indicated by the respective position indicators is accomplished by detecting the points in time in which the respective inductive voltages $V_1$, $V_2$ exceeded a predetermined voltage value (i.e., threshold value E).

Referring to FIG. 14 of the accompanying drawing, the time duration $T_1$ that elapses between the point in time at which the pulse current is applied to the first coil 2 and the point in time at which the inductive voltage $V_1$ is detected is substantially equal to the time duration elapsing between the point in time at which the magnetostrictive oscillation wave is generated in the regions of the magnetostriction propagating media 1 around which the first coil 2 is wound to the point in time at which said magnetostrictive oscillation wave reaches the position indicated by the position indicator $3p$. Accordingly, this time duration $T_1$ may be determined and the time lapse so determined may be multiplied by the propagation velocity of the magnetostrictive oscillation wave in the processor 6 to calculate the distance $l_1$ between the first coil 2 and the position indicator $3p$, i.e., the position (coordinates) indicated by the position indicator $3p$. The distance $l_2$ between the first coils 2 and the position indicator $3q$, i.e., the position (coordinates) indicated by the position indicator $3q$ may be calculated on the basis of the time lapse $T_2$ taken before detection of the inductive voltage $V_2$.

In the position detector illustrated in FIG. 13, the inductive voltages $V_1$, $V_2$ derived from the pair of position indicators $3p$, $3q$ are provided as a composite output, since the first coil 2 and the second coil 4 wound around the respective magnetostriction propagating media 1 are connected in electrical series in a single circuit.

As a consequence, the composite inductive voltage may not exceed the threshold value E as best seen in FIG. 15(c) when the difference between said distances $l_1$ and $l_2$ is small enough. Specifically, the inductive voltage $V_1$ derived from the position indicator $3p$ located at the distance $l_1$ takes a form as illustrated by FIG. 15(a) while the inductive voltage $V_2$ derived from the position indicator $3q$ takes a form as illustrated by FIG. 15(b). The combination of these inductive voltages $V_1$, $V_2$ results in a mutual cancellation between the positive component and the negative component thereof, as illustrated in FIG. 15(c). When the distances $l_1$, $l_2$ are equal to each other, the resultant detection erroneously suggests that a single position is indicated, or no position is indicated, in spite of the actual situation that two positions are indicated.

In view of the above-mentioned disadvantage, i.e., the combination or composition of the two inductive voltages $V_1$, $V_2$, another type of position detector has been proposed, in which both the first coils 2 and the second coils 4 are wound around the individual magnetostriction propagating media 1 so that the pulse current is separately applied to the respective first coils 2 and thereby detection of said inductive voltages as well as determination of the time lapse before generation of such inductive voltages is also separately achieved. With a position detector of this type, the number of the magnetostriction propagating media increases inconveniently when the position detection is required over a wide range and the time required for determination becomes longer since the determination must be done separately for said increased number of the magnetostriction propagating media.

SUMMARY OF THE INVENTION

It is a principal object of the present invention to provide a position detector in which the determination of the inductive voltages can be achieved within a time shorter than in the case of separately determining the inductive voltages for the individual magnetostriction propagating media and, in which it is possible to achieve position detection over a wide range.

With this object in mind, the present invention provides a position detector comprising a plurality of magnetostriction propagating media extending substantially in parallel with one another. First coils are wound around the plurality of magnetostriction propagating media at the respective first ends thereof, and second coils are wound around the plurality of magnetostriction propagating media over respective lengths thereof for detection of positions established by position indicators adapted to generate steady magnetic fields. A current pulse is applied to each of the first coils to generate a magnetostrictive oscillation wave in the regions of the magnetostriction propagating media around which the first coils are wound. The magnetostrictive oscillation wave propagates through the media. A determination is made of the time that elapses between the point in time at which said magnetostrictive oscillation wave is generated and the point in time, after propagation through the media, at which said magnetostrictive oscillation wave reaches the regions indicated by the position indicators, which causes an induced voltage to be generated in the respective second coils. The positions indicated by said position indicators are identified on the basis of the determined time lapses.

The position detector is further characterized by the fact that adjacent two of said plurality of magnetostriction propagating media are respectively paired and each of the magnetostriction propagating media of the respective pairs are individually wound with said first coils that are connected together and second coils that are connected together so as to generate a magnetostrictive oscillation wave in said respective pairs. The plurality of magnetostriction media are arranged at irregular intervals and each of the paired magnetostriction propagating media is spaced from the adjacent paired magnetostriction propagating media by a distance smaller than that at which the individual magnetostriction propagating media of the respective pairs are spaced from each other.

Application of a pulse current to the first coils wound around one of the pairs of adjacent magnetostriction propagating media causes a magnetostrictive wave to be simultaneously generated in and propagate through the pair of magnetostriction propagating media. This magnetostrictive wave causes an inductive voltage to be generated in the second coils wound around the pair of magnetostriction propagating media and such inductive voltage has the highest value at the position where the associated second coils are subjected to the steady magnetic field generated by the associated one of the position indicators. In view of such fact, the time that elapses from the point in time at which the pulse current was applied to the first coils to the point in time at which this highest inductive voltage is generated, is determined.

A predetermined time duration after the above-mentioned operation is performed on the first pair of magnetostriction propagating media, a similar operation is repeated on the second pair of magnetostriction propagating media and so forth.

By repeating this similar operation successively on the respective pairs of magnetostriction propagating media, it is possible to detect the positions indicated by the respective position indicators in a time period as short as one-half of the time period taken by the arrangement of prior art, e.g., the arrangement in which a plurality of magnetostriction propagating media are separately provide with the first and second coils wound therearound.

DESCRIPTION OF THE PREFERRED EMBODIMENTS

The present invention will be now described in detail, by way of specific embodiments and with reference to the accompanying drawings.

Figure 1:
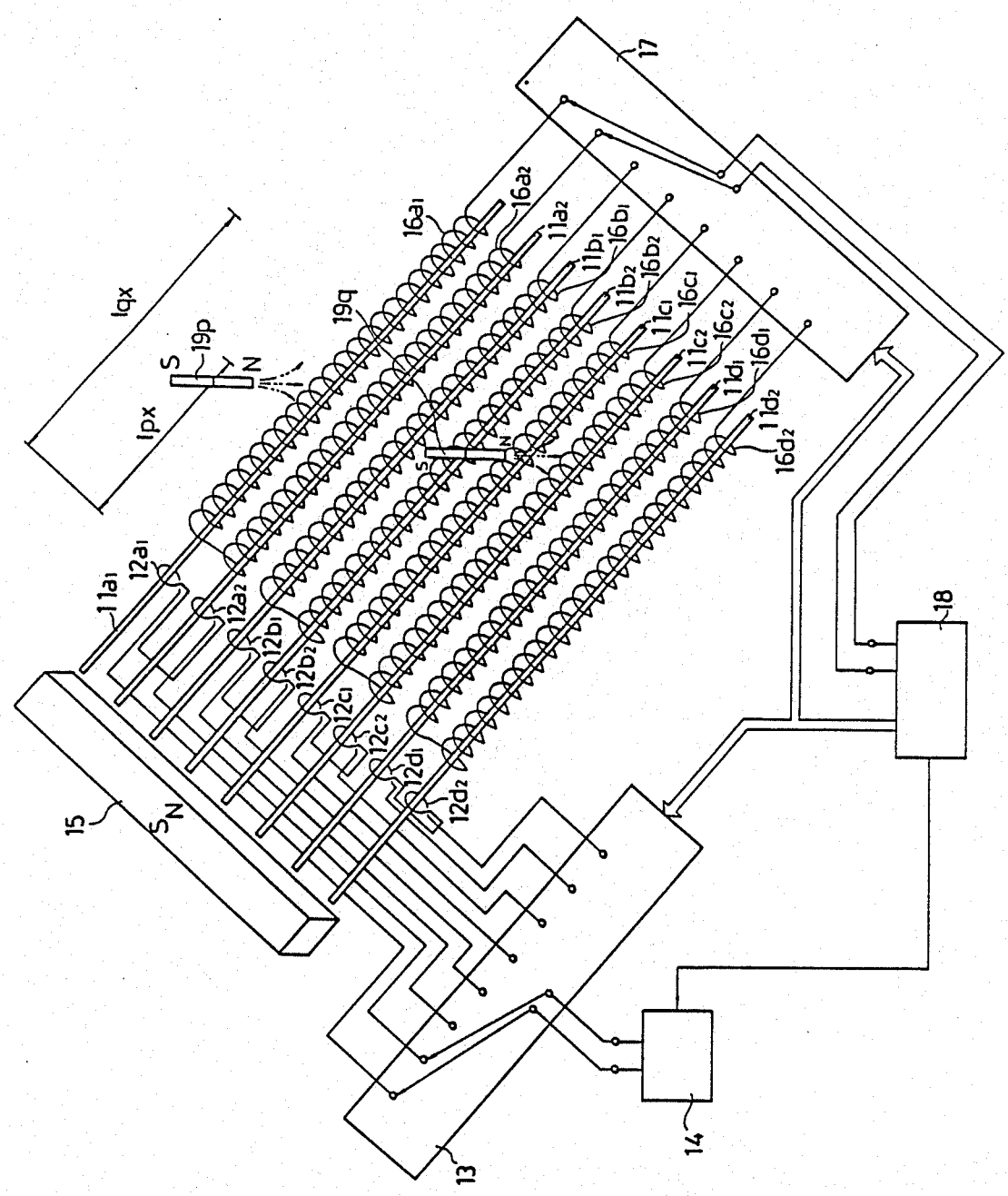
FIG. 1 is a perspective view schematically illustrating an embodiment of the position detector constructed according to the teachings of the present invention.

Referring to FIG. 1 which schematically illustrates an embodiment of the position detector constructed in accordance with the present invention, there are provided a suitable number of magnetostriction propagating media 11 made of material having a magnetostrictive effect and extending in parallel with one another. Although these magnetostriction propagating media may be of any ferromagnetic material, these magnetostriction propagating media are preferably made of material having a sufficiently high magnetostrictive effect to generate an intense magnetostrictive wave and a holding force sufficiently small that the magnetostriction propagating media are not readily magnetized when a magnet is placed adjacent thereto. As such material, amorphous alloys or like of high iron content are preferable. The suitable amorphous alloys include $Fe_{67}CO_{18}B_{14}Si_1$ (atom %) and $Fe_{81}B_{13.5}Si_{3.5}C_2$ (atom %). Each of the magnetostriction propagating media 11 is long and narrow, preferably in the form of ribbon having a rectangular cross section or wire having a circular cross section. When embodied in the form of ribbon, such ribbon may be conveniently several mm wide and several $\mu m$ to several tens of $\mu m$ thick from the viewpoint of productivity as well as characteristics. It is practically possible to obtain such amorphous alloys as a sheet having a thickness of 20 to 50 $\mu m$, so that such sheet may be cut into desired ribbon or wire. In the illustrated embodiment, the magnetostriction propagating media 11 of $Fe_{81}B_{13.5}Si_{3.5}C_2$ (atom %) are used in the form of ribbon which is 2 mm wide and 0.02 mm thick.

Magnetostriction propagating media 11 are provided at respective one ends with associated first coils 12 wound therearound. It should be noted that, although the illustrated embodiment employs a single turn, the number of turns may be two or more. First coils 12 function to generate instantaneous field variations perpendicularly to a plane defined by the coils and thereby to generate a magnetostrictive wave in regions of the respective magnetostriction propagating media 11 around which the first coils are wound. The respective first coils 12 are connected through a first multiplexer 13 to a pulse current generator 14. Pairs of first coils 12 associated with pairs of adjacent magnetostriction propagating media 11 are electrically connected together and pulse current is separately applied to each pair of coils 12 associated with a pair of magnetostriction propagating media 11 as selected by the first multiplexer 13. Accordingly, the magnetostriction propagating media 11 must be even-numbered. Eight magnetostriction propagating media are provided in the illustrated embodiment. The respective magnetostriction propagating media are designated by reference numerals $11a_1$, $11a_2$, ..., $11d_2$ wherein letters a, b, c and d represent the particular pair of media while numbers 1 and 2 represent the particular magnetostriction propagating media constituting the respective pair. Various members associated with these magnetostriction propagating media 11 are designated in the same manner. It should be understood that the pulse current generator 14 is adapted to supply the first coils 12 with sufficiently high pulse current to generate a magnetostrictive wave.

Figure 2:
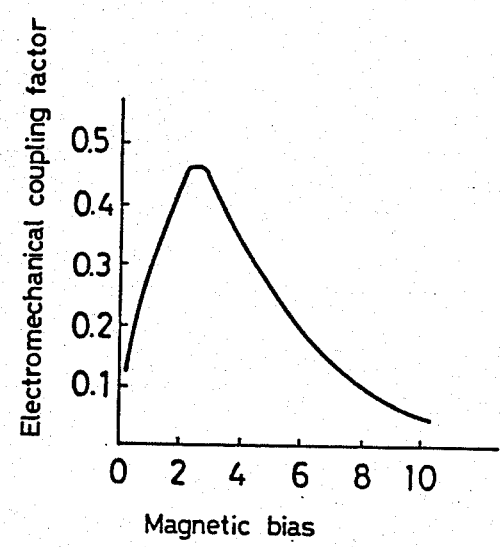
FIG. 2 is a graphic diagram illustrating electromechanical coupling factor versus magnetic bias.

There is provided a biasing magnetism generator 15 such as a permanent magnet opposed to end surfaces of the magnetostriction propagating media 11 adjacent the respective first coils 12 wound therearound in order to generate biasing magnetic fields in the regions of the respective magnetostriction propagating media 11 in which the first coils 12 are wound longitudinally of the magnetostriction propagating media 11. Generation of such biasing magnetic fields enable relatively small current pulses to generate the magnetostrictive wave of relatively large magnitude. More specifically, an electromechanic coupling factor of the magnetostriction propagating media 11 reaches a maximum value when applied with a predetermined level of the biasing magnetic field, as seen in FIG. 2. In this manner, a magnetic bias may be applied to the region of the respective magnetostriction propagating media 11 carrying the first coils 12 to achieve a efficient generation of the magnetostrictive wave.

Second coils 16 are wound around the respective magnetostriction propagating media 11 over their longitudinal extents along which desired position detections are to be performed. Like the first coils 12, these second coils 16 also are provided in pairs associated with the respective pairs of adjacent magnetostriction propagating media 11 for which the first coils 12 are separately provided. These second coils 16 are provided to detect inductive voltages generated by the magnetostrictive waves propagated through the associated magnetostriction propagating media 11 and wound therearound in the same direction so that the polarity of magnetic coupling is reversed between coils associated with adjacent magnetostriction propagating media 11. These second coils 16 are connected by a second multiplexer 17 to a processor 18.

The processor 18 functions to supply both the first multiplexer 13 and the second multiplexer 17 with signals, to connect the first coils 12 on the respective pair of magnetostriction propagating media 11 to the pulse current generator 14 and to connect the second coils 16 on said respective pair of magnetostriction propagating media 11 to said processor 18.

Referring to FIG. 1, reference numerals 19p and 19q designate position indicators adapted to generate steady magnetic fields. Although the illustrated embodiment utilizes bar magnets, each having a diameter of 3 mm and a length of 50 mm as these position indicators, configurations such as plate-like, ring-like and angular magnets or electromagnets may alternatively be used. According to the present invention, the positions indicated by these position indicators 19p, 19q are to be detected.

Figure 7:
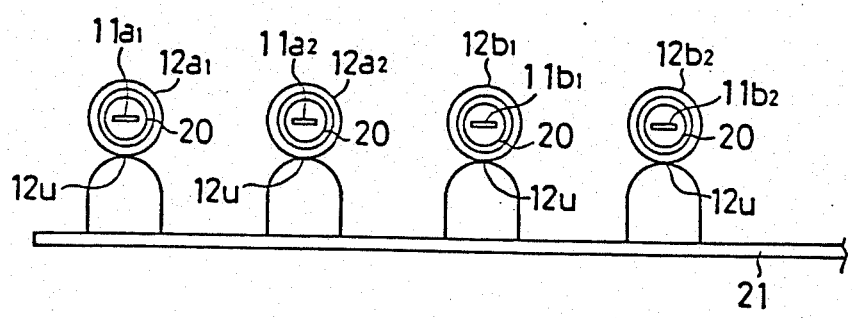
FIG. 7 is a side view illustrating coils and magnetostriction propagating media arranged at regular intervals.
Figure 8:
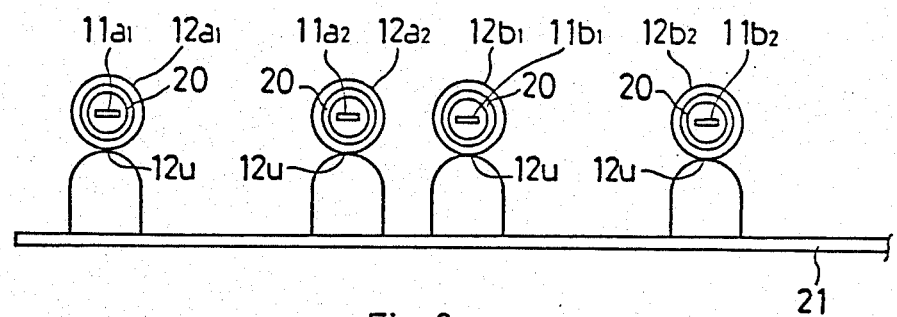
FIG. 8 is a view similar to FIG. 7 but with the magnetostriction propagating media arranged at irregular intervals.

The first coils 12 are carried by said magnetostriction propagating media 11 in a manner as shown by FIG. 7. Specifically, the respective magnetostriction propagating media 11 are enclosed by associated cylindrical holders 20. The first coils 12 are wound around these holders 20 or around the respective one ends of said magnetostriction propagating media 11 themselves projected from these holders 20 and, after wound by a predetermined number of turns, each of said first coils 12 has its turn-terminals 12u crossing each other on the lower side of the associated magnetostriction propagating medium 11, then connected to a print substrate 21. The first coils 12 of the associated pair of adjacent magnetostriction propagating media 11 are interconnected on this print substrate 21 and then connected to said first multiplexer 13. It should be understood that, in the embodiment shown by FIG. 7, all the individual magnetostriction propagating media 11 are arranged at regular intervals.

Figure 3:
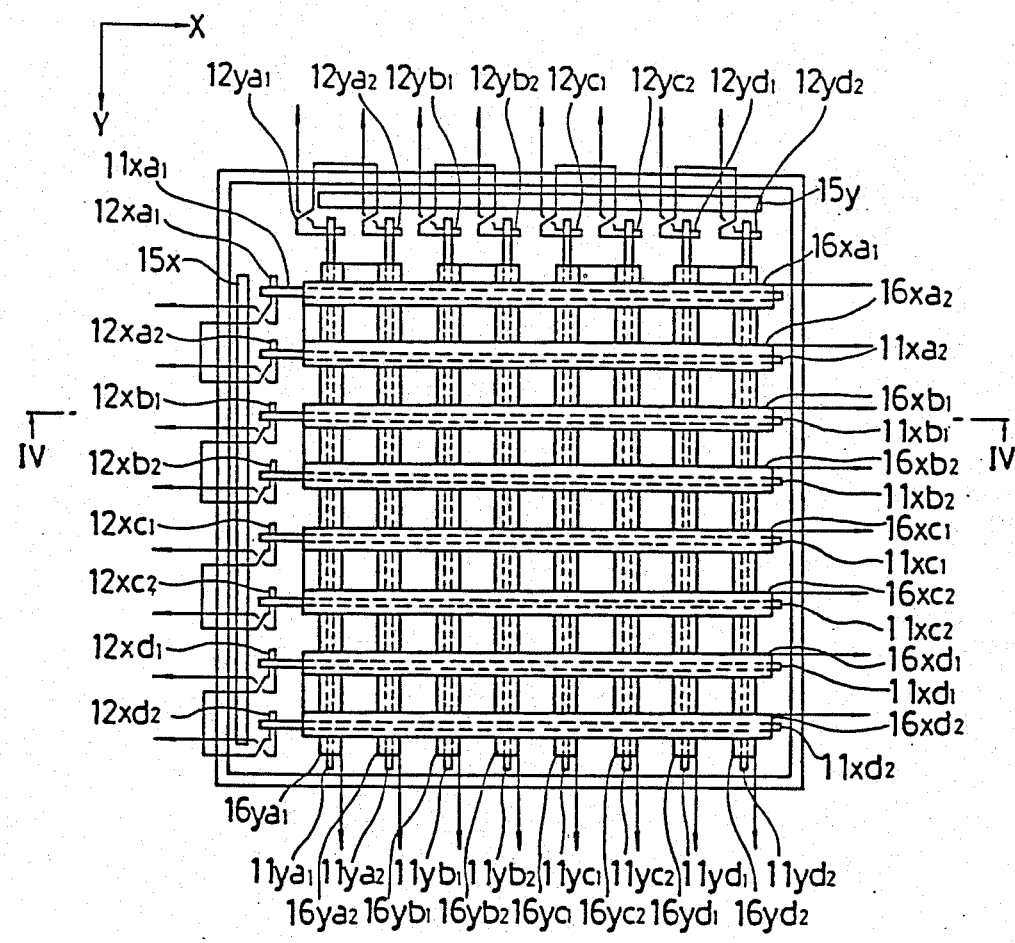
FIG. 3 is a lane view illustrating a position detector for two-dimensional position detection.

Two pairs of the above-mentioned assemblies comprising the components such as the magnetostriction propagating media 11 and the first coils 12 are combined in the orthogonal relationship as seen in FIG. 3 to provide a two-dimensional position detector in which one pair is used to detect a X-position while the other pair is used to detect a Y-position. The pair of said assemblies used to detect the X-position is designated by additional reference x and the pair of said assemblies used to detect the Y-position is designated by additional reference y. In the same manner as previously mentioned with respect to FIG. 11, the particular pair of magnetostriction propagating media 11 including the first and the second coils are designated by letters, a,b,c,d, . . . as the further additional references and the individual assemblies constituting the respective pairs are designated by numbers 1 and 2 as still other additional references. In this manner, the respective assemblies are expressed as the magnetostriction propagating media $11xa_1$, $11xa_2$, . . . , $11xd_2$, $11ya_1$, $11ya_2$, . . . , $11yd_2$.

Figure 4:
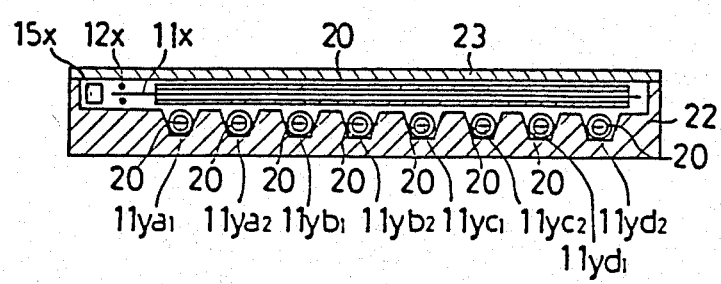
FIG. 4 is a sectional view taken along a line IV—IV in FIG. 3.

The magnetostriction propagating media $11x$ and $11y$ combined in the orthogonal relationship are placed one on another as seen in FIG. 4, contained in a casing 22 of nonmagnetic metal and fixed in place with adhesive or the like. Although the biasing magnetic field generator 15 is shown as stationarily disposed n the bottom of the casing 22 so as to be opposed to the one end surface of the magnetostriction propagating media 11, said generator 15 may be disposed above, beneath or laterally of said magnetostriction propagating media 11. The top of the casing 22 is closed by a cover 23 made of nonmagnetic metal or synthetic resin, along the top surface of which said position indicators $19p$, $19q$ may be moved to perform the operation of position indication.

Figure 5:
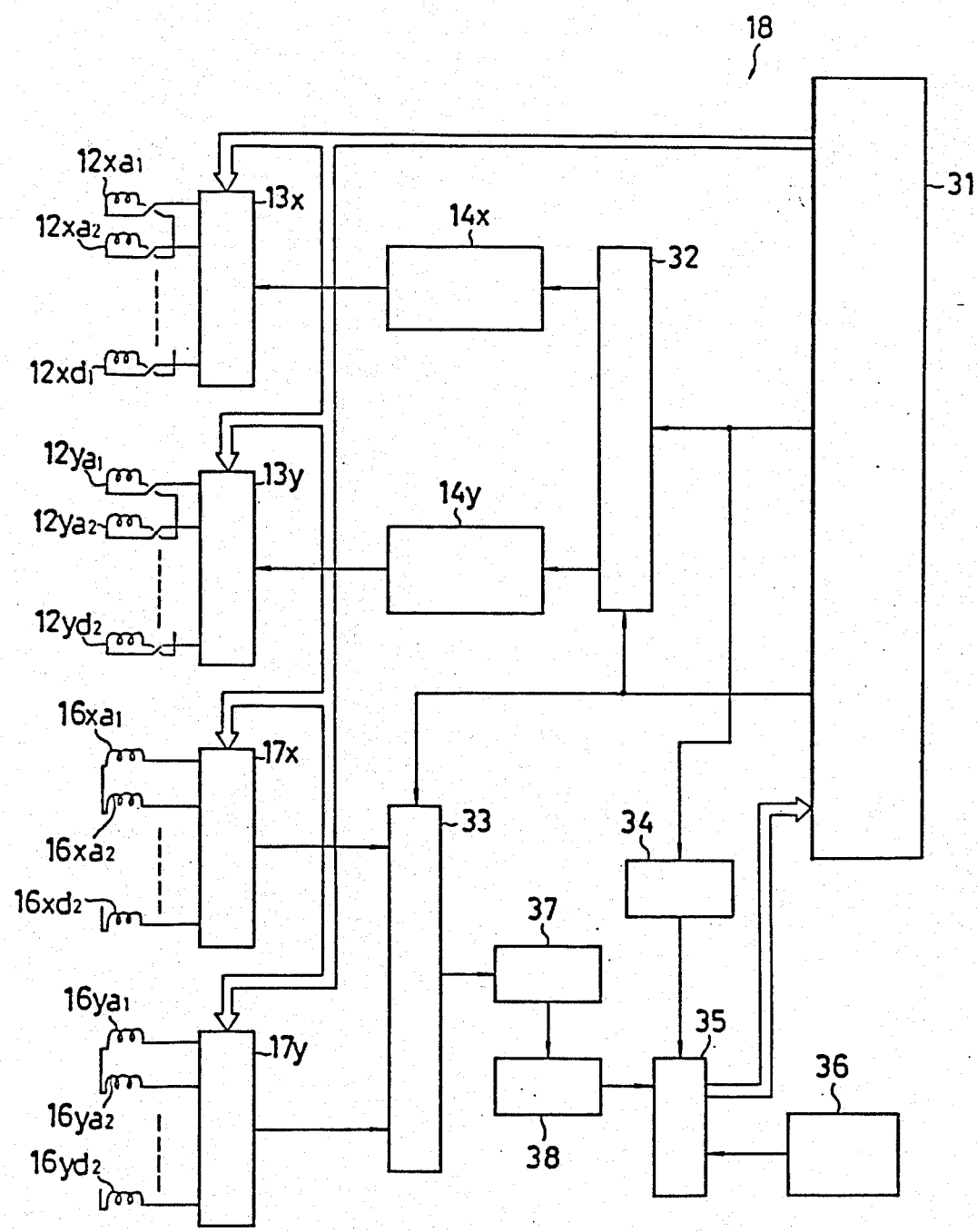
FIG. 5 is a block diagram corresponding to the two-dimensional position detection in FIG. 3.

FIG. 5 is a block diagram illustrating an electric circuit arrangement corresponding to the X- and Y-position detector shown by FIGS. 3 and 4. Referring to FIG. 5, reference numerals $13x$ and $13y$ designate multiplexers respectively associated with the first coils $12x$, $12y$ of X- and Y-directions, respectively; reference numerals $14x$ and $14y$ designate pulse current generators for X- and Y-directions, respectively; and reference numerals $17x$ and $17y$ designate multiplexers respectively associated with the second coils $16x$, $16y$ of X- and Y-directions, respectively. The processor 18 comprises a microprocessor 31, multiplexers 32, 33, a monostable multivibrator (monomulti) 34, a counter 35, a clock pulse generator 36, an amplifier 37 and a comparator 38.

Now operation of said X- and Y-position detector will be described on the assumption that two positions simultaneously indicated by the pair of position indicators $19p$, $19q$ are to be detected.

It is first assumed that the position detector of FIG. 1 is used to detect the X-position and the position indicator $19p$ is positioned above the magnetostriction propagating media $11xa_1$ with interposition of the cover 23 of the casing 22 at a distance of $1px$ in the X-direction from a center of the coil plane defined by the associated first coil $12x$ while the other position indicator $19q$ is positioned above the magnetostriction propagating medium $11xc_2$ at a distance of $1qx$ in the X-direction from a center of the coil plane defined by the associated first coil $12x$. It is then assumed that the position detector of FIG. 1 is used to detect the Y-position and the position indicator $19p$ is positioned above the magnetostriction propagating medium $11yc_2$ at a distance of $1py$ in the Y-direction from a center of the coil plane defined by the associated first coil $12y$ while the other position indicator $19q$ is positioned above the magnetostriction propagating medium $11yd_1$ at a distance of $1qy$ in the Y-direction from a center of the coil plane defined by the associated first coil $12y$. Thus, it is assumed that the respective magnetostriction propagating media $11xa_1$, $11yc_2$, $11xc_2$, $11yd_1$ are applied by respective position indicators $19p$, $19q$ with a magnetism sufficient to increase the electromechanical coupling factor.

Upon reception of an instruction signal for start of determination as a result of operation of appropriate switching means or the like (not shown), the microprocessor 31 provides a X-direction selecting transfer signal of X- and Y-direction selecting transfer signals to the multiplexers 32, 33 and at the same time selects the pulse current generator $14x$ and the second multiplexer $17x$. The microprocessor 31 also provides information indicating that the respective first pair of coils of the X- and Y-direction coils are connected to the first multiplexers $13x$, $13y$ and the second multiplexers $17x$, $17y$. Thus, the first coils $12xa_1$, $12xa_2$ and the second coils $16xa_1$, $16xa_2$ of the first X-direction pair and the first coils $12ya_1$, $12ya_2$ and the second coils $16ya_1$, $16ya_2$ of the first Y-direction pair are independently selected. At the same time, the microprocessor 31 supplies through the multiplexer 32 a trigger pulse to the pulse current generator $14x$ which supplies, in turn, pulse current to the first coils $12xa_1$, $12xa_2$ of the X-direction. The trigger pulse is also applied through the monostable multivibrator 34 to the counter 35 which is then reset and starts to count clock pulses provided from the clock pulse generator 36. This clock pulse generator 36 has a pulse repetition frequency on the order of 100 MHz.

When the pulse current generator $14x$ is activated and the pulse current generated therefrom is applied to the first X-direction coils $12xa_1$, $12xa_2$, instantaneous field variations occur in these first coils $12xa_1$, $12xa_2$, generating magnetostrictive waves in the regions of the magnetostriction propagating media $11xa_1$, $11xa_2$ along which said first coils $12xa_1$, $12xa_2$ are wound.

A magnetic field is generated as the pulse current flows through the first coils $12xa_1$. It should be noted here that the direction in which the current flows through the portion of the coil extending from the turn-terminal $12u$ to the print substrate 21 is reverse to the direction in which the current flows through the circular portion of the coil directly wound around the magnetostriction propagating medium $11xa_1$, since the first coil $12xa_1$ crosses itself at the turn-terminals $12u$. Accordingly, magnetic flux developing around these portions have their directions reverse to each other so that the corresponding unnecessary magnetic flux emitted externally as noises advantageously cancel each other to reduce their undesirable effects. This is true also for the other first coils $12x$ and for the first Y-direction coils $12y$.

The magnetostrictive waves generated in the manner as has been above-mentioned are propagated at a specific propagation velocity (approximately 5000 m/sec.) longitudinally through the respective magnetostriction propagating media $11xa_1$, $11xa_2$. During such propagation, if the magnetostriction propagating media $11xa_1$, $11xa_2$ are placed within a steady magnetic field, inductive voltages are generated in the respective second coils $16xa_1$, $16xa_2$ under the effect of said steady magnetic fields.

Figure 6:
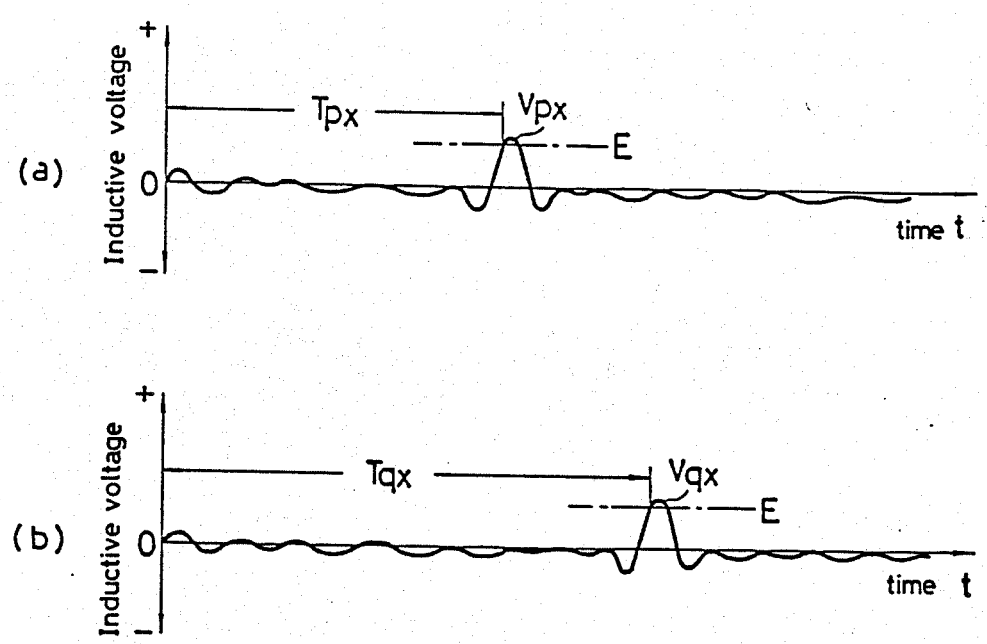
FIG. 6 is a graphic diagram illustrating the inductive voltage developed in the position detection coil wound around each of magnetostriction propagating media as a function of the time.

The position indicator $19p$ is positioned at this point in time above the magnetostriction propagating medium $11xa_1$, as has previously been assumed, and said inductive voltage is generated in the second coil $16xa_1$ occupying the position indicated by this position indicator $19p$. This is illustrated by FIG. 6(a), in which the time t is indicated on abscissa and the variation in the inductive voltage is indicated on ordinate. As seen in FIG. 6(a), a pulse-like high inductive voltage Vpx appears when the magnetostrictive wave generated in said region of the first coil $12xa_1$, after propagated through the magnetostriction propagating medium $11xa_1$, reaches tee position at which position indicator $19p$ generates a steady magnetic field sufficient to increase the electromechanical coupling factor of this magnetostriction propagating medium $11xa_1$. the time lapse Tpx from the point in time at which the pulse current is applied to the first coil $12xa_1$ to the point in time at which the inductive voltage Vpx exceeds a predetermined threshold value E, substantially corresponds to the time lapse for propagating the magnetostrictive wave through the magnetostriction propagating medium $11xa_1$ from the position of the first coil $12xa_1$ to the position indicated by the indicator $19p$.

The inductive voltage Vpx generated in said second coil $16xa_1$ is supplied through the second multiplexer $17x$ to the amplifier 37 and, after amplified thereby, to the comparator 38. The comparator 38 compares this inductive voltage with the threshold value E and, when the inductive voltage Vpx exceeds the threshold value E, applies a stop pulse to the counter 35, causing the latter to terminate counting. In this manner, the counter 35 provides a digital value corresponding to the time lapse from the point in time at which the pulse current is applied to the first coil $12xa_1$ to the point in time at which the inductive voltage Vpx generated in the second coil $16_{xa1}$ exceeds the predetermined threshold value E. This digital value also corresponds to the time duration taken for propagation of the magnetostrictive wave through the magnetostriction propagating medium $11xa_1$ at the predetermined propagation velocity from the position of the first coil $12xa_1$ to the position indicated by the position indicator $19p$, i.e., by the distance of $1px$ in the X-direction. The microprocessor 31 reads the count value of the counter 35 as a first X-position data $X_1$.

After a predetermined time has elapsed, the microprocessor 31 provides the first multiplexers $13x$, $13y$ and the second multiplexers $17x$, $17y$ with information indicating that the respective second pairs of coils should be selected so that the first coils $12xb_1$, $12xb_2$ as well as the second coils $16xb_1$, $16xb_2$ of the second pair of X-direction are selected to be operated. At the same time, the microprocessor 31 outputs the trigger pulse, in the same manner previously described with respect to the first pair of X-direction, to the multiplexer 32 and the monostable multivibrator 34. The counter 35 is reset with this trigger pulse and the trigger pulse activates the pulse current generator $14x$ to apply a pulse current to the first coils $12xb_1$, $12xb_2$ of X-direction. In response, magnetostrictive waves are generated in the regions of the respective magnetostriction propagating media $11xb_1$, $11xb_2$ along which the respective first coils $12xb_1$, $12xb_2$ are wound.

The inductive voltages generated due to these magnetostrictive waves in the respective second coils $16xb_1$, $16xb_2$ of X-direction are supplied, just as in the previously mentioned case, through the second multiplexer $17x$ to the amplifier 37 and the comparator 38 in which these inductive voltages are compared to the threshold value E. However, no inductive voltage in excess of the threshold value E, and hence none of said stop pulse required to obtain the digital value, are generated because of the fact that none of the position indicators are placed above the magnetostriction propagating media $11xb_1$, $11xb_2$.

The similar operation may be successively performed on the respective pairs of the first coils $12x$ and the second coils $16x$ to achieve desired position detection for every pair of the magnetostriction propagating media $11x$. When the first coils $12xc_1$, $12xc_2$ and the second coils $16xc_1$, $16xc_2$ associated with the pair including the magnetostriction propagating medium $11xc_2$ indicated by the position indicator $19q$ are selected, the inductive voltage Vqx exceeding the threshold value E is generated in the second coil $16xc_2$, as seen in FIG. 6(b). Counter 35 provides a digital value corresponding to the time lapse Tqx from the point in time at which the first coils $12xc_1$, $12xc_2$ are applied with the pulse current to the point in time at which the magnetostrictive wave generated thereby reaches the position indicated by the position indicator $19q$ and an inductive voltage pulse Vqx in excess of the threshold value E is detected, i.e., to the distance $1qx$ in X-direction. Said digital value provided by the counter 35 is read by the microprocessor 31 as a second X-position data $X_2$.

Upon completion of the position detecting operation with respect to the X-direction, the microprocessor 31 provides a Y-direction selecting transfer signal to the multiplexers 32, 33 and at the same time selects the pulse current generator $14y$ and the second multiplexer $17y$. The microprocessor 31 successively provides information indicating that the respective pairs of coils of X- and Y-directions are selected to the first multiplexers $13x$, $13y$ and the second multiplexers $17x$, $17y$. Furthermore, the microprocessor 31 successively provides a trigger pulse to the multiplexer 32 and the monostable multivibrator 34. In this way, the position detection may be achieved for every pair of magnetostriction propagating media $11ya_1$, $11ya_2$, ..., $11yd_1$, $11yd_2$ just as in the case of the X-direction position detection.

When the first coils $12yc_1$, $12yc_2$ and the second coils $16yc_1$, $16yc_2$ associated with the pair including the magnetostriction propagating medium $11yc_2$ are selected and when the first coils $12yd_1$, $12yd_2$ and the second coil $16yd_1$, $16yd_2$ associated with the pair including the magnetostriction propagating medium $11yd_1$ are selected, the inductive voltages in excess of the threshold value E are detected in the respective second coils $16yc_2$, $16yd_1$ and the digital values corresponding to the distances $1py$, $1qy$ in the Y-direction are provided by the counter 35. The microprocessor 31 reads these digital values provided by the counter 35 as the first and second Y-position data Yhd 1 and $Y_2$.

The X-position data $X_1$, $X_2$ and the Y-position data $Y_1$, $Y_2$ obtained in this manner in the form of the digital values are temporarily stored in the microprocessor 31 so that they may be outputted to a computer or the like if necessary. So long as the determination start instructing signal continues to be applied to the microprocessor 31, operation of the position determination means is repeated and the determined value i correspondingly updated. Upon reception of a data input instructing signal generated by operation of appropriate switch means or the like (not shown), the microprocessor 31 outputs said X- and Y-position data $X_1$, $X_2$ and $Y_1$, $Y_2$ in the form of digital values at the current point in time as the input values to a computer or the like. Such operation may be repeated to provide data concerning the positions successively indicated by the position indicators.

Figure 9:
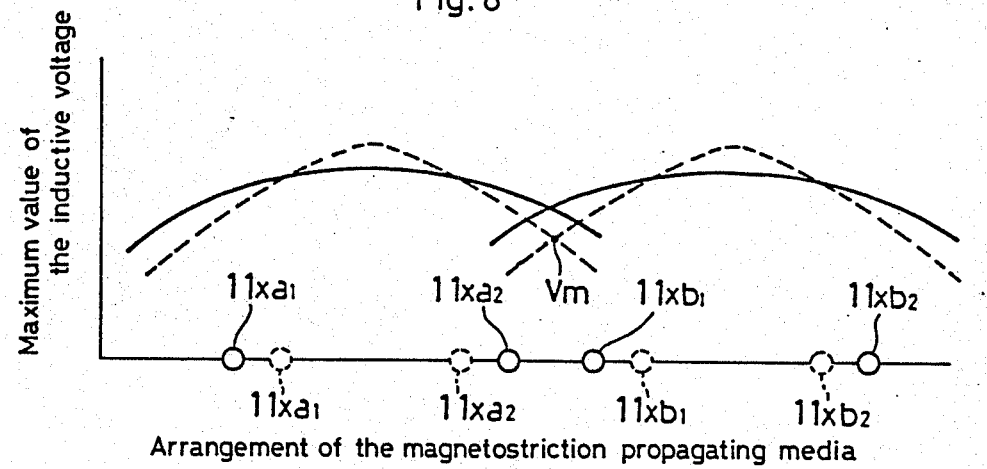
FIG. 9 is a graphic diagram illustrating the variation occurring in the inductive voltage as a position indicator is moved longitudinally and transversely with respect to the magnetostriction propagating media.

With the present embodiment, the position indicated by the position indicator 19p or 19q is detected by each set of paired magnetostriction propagating media 11. Therefore, the inductive voltages are generated in at least a pair of the second coils 16 wound around the associated pair of adjacent magnetostriction propagating media 11. Assuming that the position indicator 19 is moved longitudinally and transversely of the magnetostriction propagating media 11, the inductive voltage will have its maximum value vary as illustrated by FIG. 9, which illustrates arrangement of the magnetostriction propagating media 11 on the abscissa and the maximum value of the inductive voltage on the ordinate. Circles drawn by broken lines along the abscissa represent the respective magnetostriction propagating media $11xa_1$, $11xa_2$, $11xb_1$, $11xb_2$ arranged at regular intervals and the maximum value of the inductive voltage varies as shown by the curves plotted by broken lines in accordance with said equidistance arrangements of these magnetostriction propagating media $11ixa_1$, $11xa_2$, $11xb_1$, $11xb_2$.

When the position indicator 19 is located substantially in the middle between the paired magnetostriction propagating media $11xa_1$, $11xa_2$ (or $11xb_1$, $11xb_2$), inductive voltages are generated in both the magnetostriction propagating media $11xa_1$, $11xb_2$ at substantially the same position. These inductive voltages are combined into a peak amplitude which is the highest of those occurring in all cases. Deviation of the position indicator 19 from said middle position towards any of the paired magnetostriction propagating media results in a higher inductive voltage being generated in the magnetostriction propagating medium 11 closer to the position indicator 19 and a lower inductive voltage being generated in the magnetostriction propagating media 11 remote from the position indicator 19, so that the maximum value of the inductive voltage combined thereof decreases as the deviation from the middle position increases. When the position indicator 19 is located intermediately of the magnetostriction propagating media $11xa_2$, $11_{xb1}$ which are adjacent each other but respectively belong to different pairs, the maximum value of the inductive voltage further decreases. This peak amplitude value at a substantially middle point between these magnetostriction propagating media $11xa_2$, $11xb_1$ is indicated as Vm in FIG. 9. Accordingly, said threshold value E must be set to a level lower than Vm when the magnetostriction propagating media 11 are arranged at regular intervals. The threshold value E set to such lower level may lead to a malfunction, since the inductive voltage that should not be detected tends to be detected.

Figure 10:
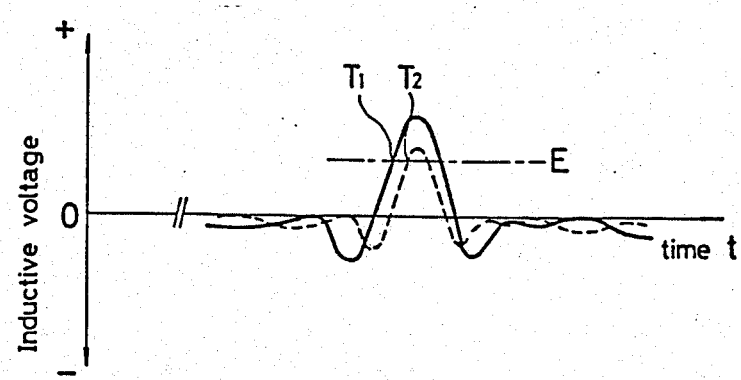
FIG. 10 is a graphic diagram illustrating the variation in inductive voltage magnitude as a function of the time, as a result of deviation in the position at which the inductive voltage is detected.

When a difference between the highest and lowest inductive voltages that must both be detected is unacceptably large, the point at which the high inductive voltage exceeds the threshold value E and the point at which said low inductive voltage exceeds the threshold value deviate from each other, as seen in FIG. 10, even when the position indicator 19 is held on the same position. More specifically, the high inductive voltage indicated by solid line is detected at $T_1$ to exceed the threshold value E while the low inductive voltage indicated by broken line is detected at $T_2$ to exceed said threshold value E. Thus, the detection points deviate with respect to each other with respect to time lapse.

To overcome this problem, it is important to increase the threshold value E and to reduce the difference between the high and low inductive voltages. When the magnetostriction propagating media 11 are arranged at regular intervals, the intervals may be made closer in order to overcome this problem. However, this would result in increased number of the magnetostriction propagating media 11 to be arranged within a range over which the positions must be detected.

In view of such inconvenience, a spacing between the magnetostriction propagating media $11xa_1$, $11xa_2$ belonging to the same pair is made larger than a spacing between the magnetostriction propagating media $11xa_2$, $11xb_1$ which are adjacent each other but belong to different pairs. The maximum value of the inductive voltage versus the arrangement of the magnetostriction propagating media $11xa_1$, $11xa_2$, $11xb_1$, $11xb_2$ in this case is illustrated by solid lines in FIG. 9. As shown, the spacing between the magnetostriction propagating media $11xa_1$, $11xa_2$, belonging to the same pair is enlarged while the spacing between the magnetostriction propagating media $11xa_2$, $11xb_1$ which are adjacent each other but belong to a different pair is reduced with respect to the case in which all the individual magnetostriction propagating media 11 are arranged at regular intervals. Thus, a variation in the maximum value of the inductive voltage is reduced. Additionally, when the position indicator 19 is located in a substantially middle point between the magnetostriction propagating media $11xa_2$, $11xb_1$, said position indicator 19 is closer to these magnetostriction propagating media 11 than when all the individual magnetostriction propagating media 11 are arranged at regular intervals. As a result, the generated inductive voltage is correspondingly increased and this permits the threshold value E to be set to a sufficiently high level to avoid any malfunction.

It has been found that, with the magnetostriction propagating media 11 being equidistance arranged, the position can be detected substantially with a desired accuracy when said magnetostriction propagating media are arranged at intervals of approximately 21 mm. With the magnetostriction propagating media 11 being arranged at irregular intervals, it has been found that the spacing between the magnetostriction propagating media 11 belonging to the same pair may be set to approximately 32 mm while the spacing between the adjacent magnetostriction propagating media 11 belonging to the different pair may be set to approximately 10 mm to detect the positions with a desired accuracy. With the position detector comprising eight magnetostriction propagating media 11, the distance between the outermost magnetostriction propagating media 11 is approximately 147 mm when these magnetostriction propagating media are arranged at regular intervals and the distance is approximately 158 mm slightly larger than in the former case. Accordingly, the number of magnetostriction propagating media 11 may be reduced with the position detector comprising the magnetostriction propagating media 11 arranged at irregular intervals with respect to the position detector comprising the magnetostriction propagating media 11 arranged at regular intervals for a given range of detection.

Figure 11:
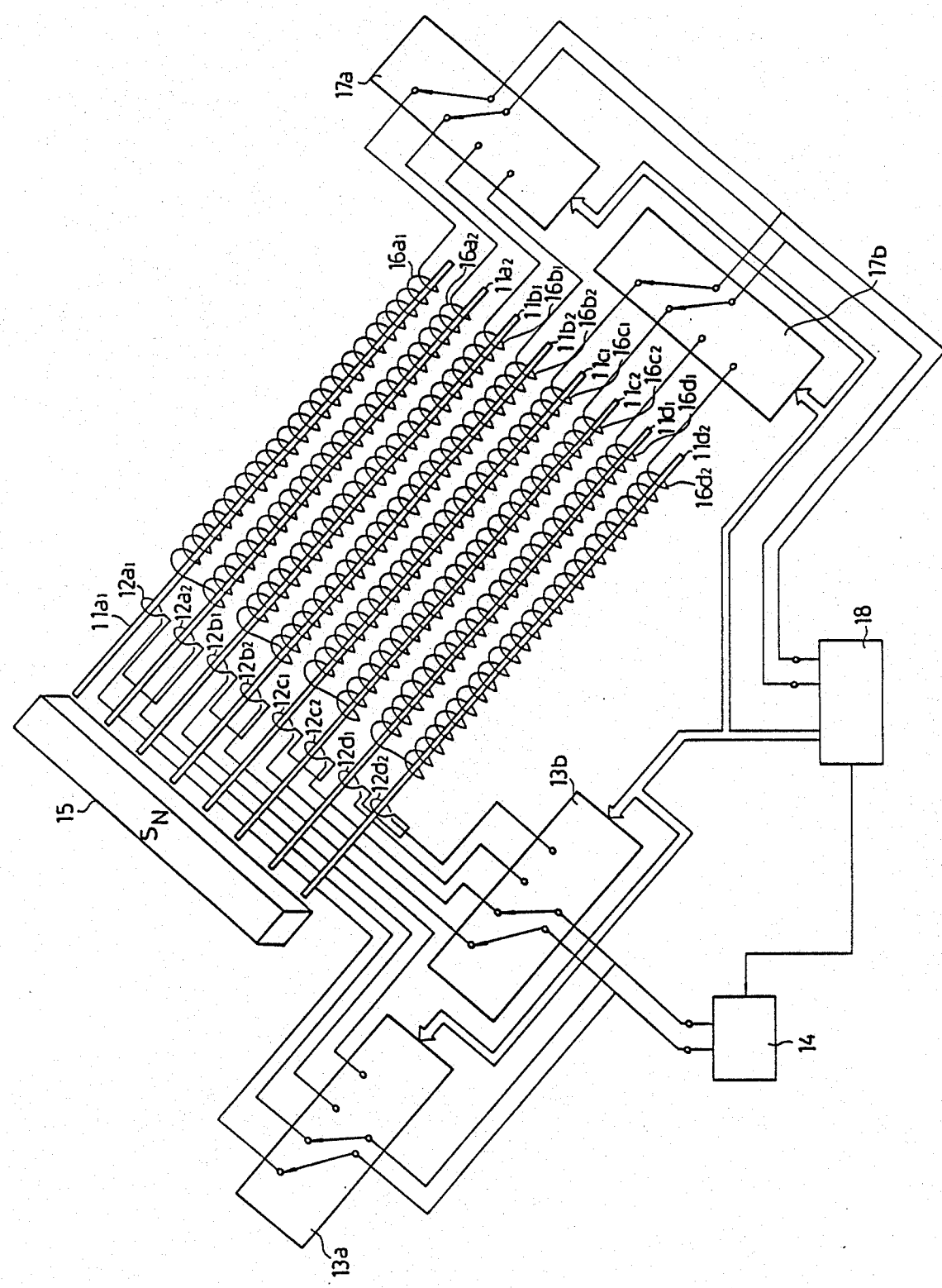
FIG. 11 is a view similar to FIG. 1 but illustrating another embodiment of the position detector constructed in accordance with the teachings of the present invention.

Another embodiment of the position detector constructed in accordance with the teachings of the present invention is shown in FIG. 11. In this embodiment, the first coils 12 and the second coils 16 are further divided into several groups, respectively, so that the first coils 12 and the second coils 16 associated with a certain pair belonging to each group may be simultaneously selected to perform the desired position detection.

Referring to FIG. 11, reference numerals 13a, 13b designate first multiplexers and reference numerals 17a, 17b designate second multiplexers. The first multiplexer 13a is adapted to connect selectively the first coil pair 12a or 12b to a pulse current generator 14 while the first multiplexer 13b is adapted to connect selectively the first coil pair 12c or 12d to said pulse current generator 14. The second multiplexer 17a is adapted to connect selectively the second coil pair 16a or 16b to a processor 18 while the second multiplexer 17b is adapted to connect selectively the second coil pair 16c or 16d to said processor 18. The respective multiplexers 13a, 13b, 17a, 17b are supplied from the processor 18 with the same selection information so that the position detection may be simultaneously achieved on the pair of magnetostriction propagating media 11a, 11b and the pair of magnetostriction propagating media 11c, 11d.

According to the construction of this embodiment, it is possible to perform the position detection simultaneously on two pairs of magnetostriction propagating media 11 and, therefore, the time period required to complete the position detection on all the magnetostriction propagating media 11 can be one-half or shorter relative to the case in which the first coils and the second coils are not divided into the several groups.

Although the present invention has been described hereinabove as the first coils 12 being used to generate the magnetostrictive wave and the second coils 16 being used to detect the inductive voltage, the reversed arrangement is also possible such that the second coils 16 are used to generate the magnetostrictive wave while the first coils 12 are used to detect the inductive voltage. In such a case, said magnetostrictive wave is generated immediately beneath the position indicator 19 and the inductive voltage generated when this magnetostrictive wave reaches the associated first coil 12 is detected.

Figure 12:
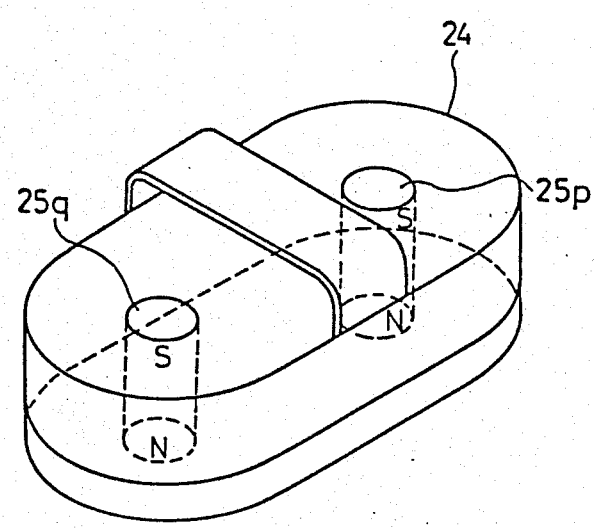
FIG. 12 is a perspective view showing by way of example an electronic blackboard eraser suitable for use as the position detector according to the present invention.
Figure 13:
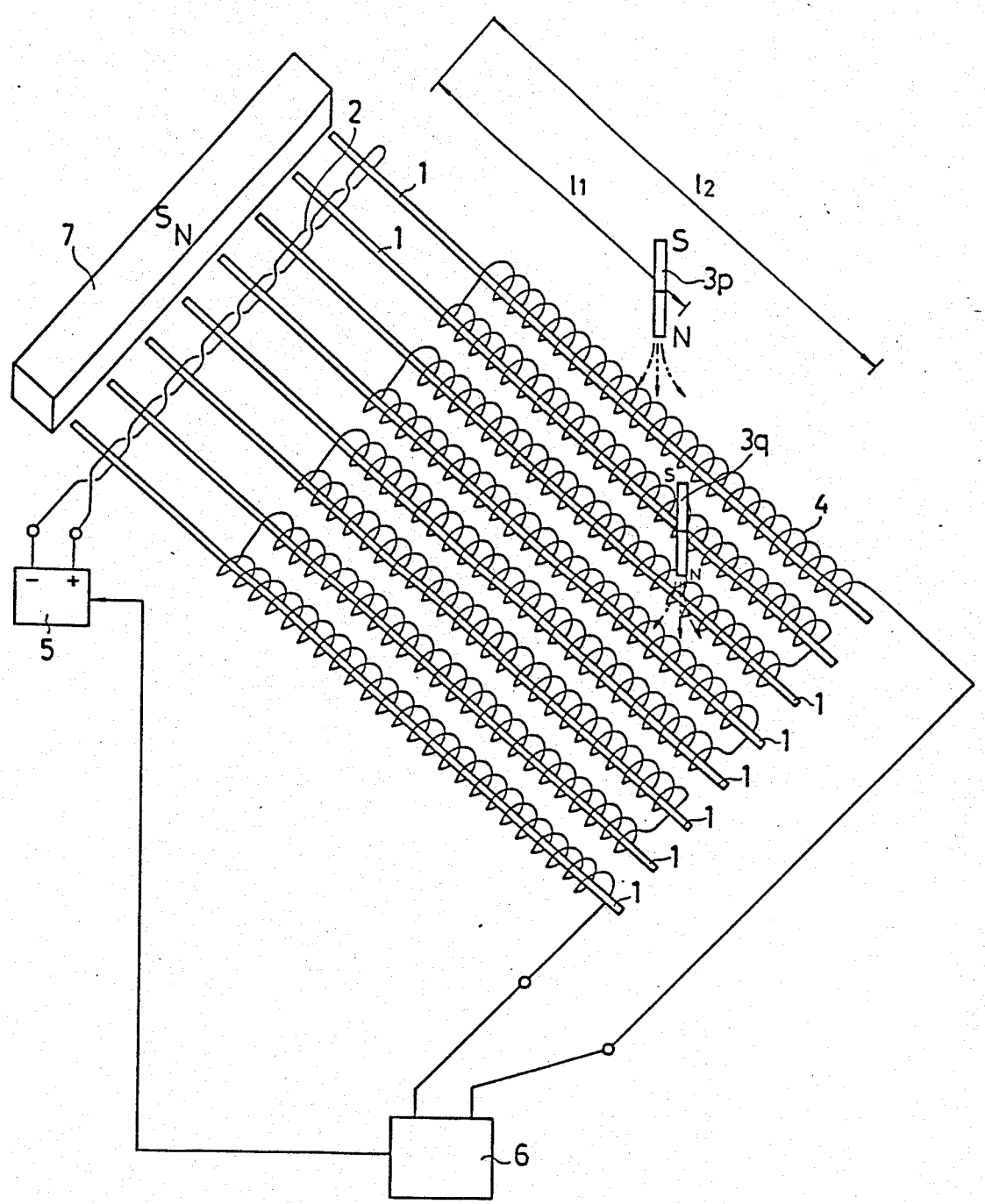
FIG. 13 is a view similar to FIG. 1 but schematically illustrating the position detector of prior art.
Figure 14:
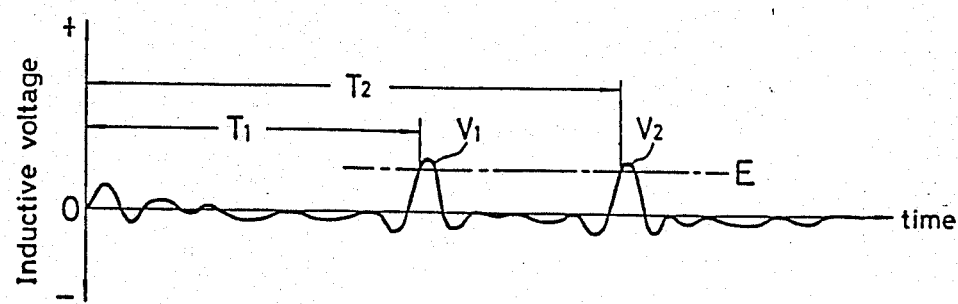
FIGS. 14 and 15 are graphic diagrams showing a variation in the inductive voltage occurring in the position detector of prior art as a function of the time, when a pair of position indicators are relatively remote from each other longitudinally of the magnetostriction propagating media as shown by FIG. 4 and when the pair of position indicators are close to each other as shown by FIG. 15.
Figure 15:
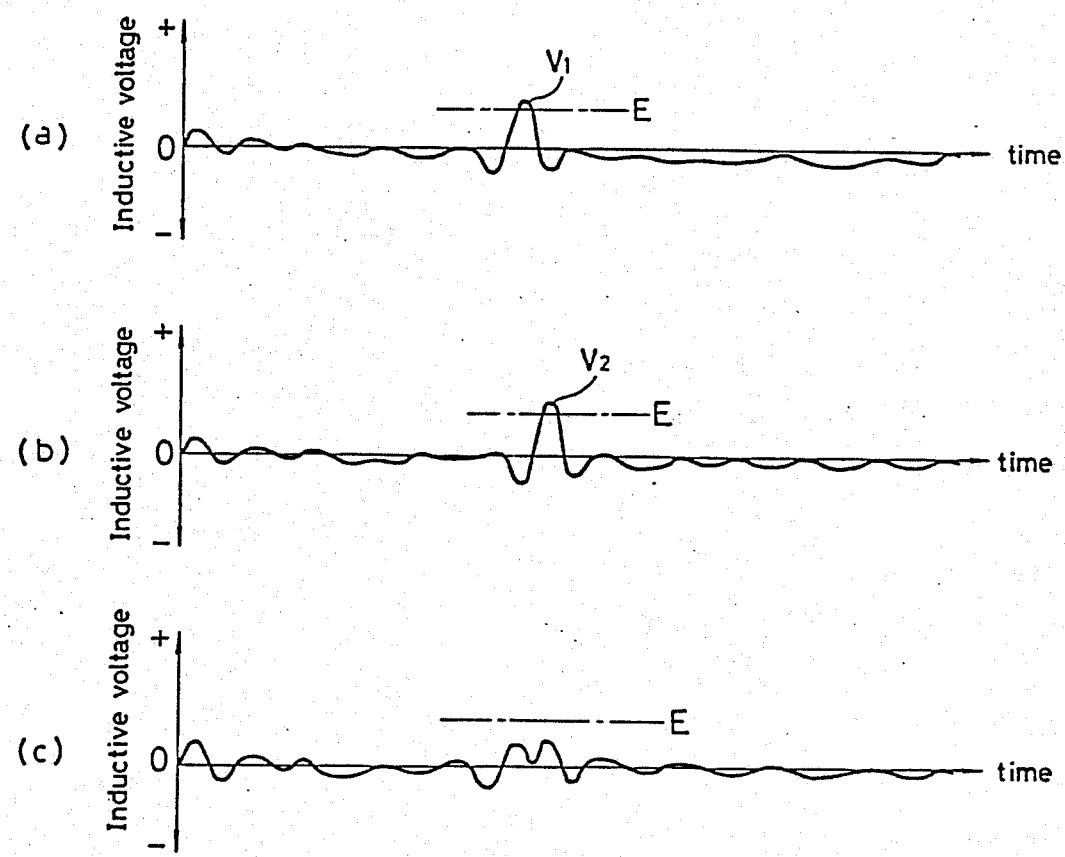

When position detection is performed according to this embodiment, no more than one position indicator may be simultaneously located above the magnetostriction propagating media 11 belonging to the same pair. This requirement is easily met when the positions indicated by a pair of position indicators 25p, 25q always spaced from each other by a predetermined distance as in an eraser 24 used for erasure of an electronic blackboard or the like shown in FIG. 12 are to be detected. Specifically, the spacing between the magnetostriction propagating media 11 paired to be used for the position detection is appropriately selected with respect to the predetermined distance between the position indicators 25p, 25q so that the pair of position indicators 25p, 25q cannot be located simultaneously above the magnetostriction propagating media 11 of the same pair.

As will be apparent from the foregoing description, the position detector constructed according to the present invention enables the position detection to be performed simultaneously on each pair of adjacent magnetostriction propagating media and thereby enables the position detection to be achieved in one-half of the time, or less, relative to the case in which the position detection is performed on the individual magnetostriction propagating media. Within the same time period, it is possible for the present invention to achieve the position detection over a wider range.

Furthermore, the respective multiplexers of this invention may have fewer channels or choices than in the position detector of prior art adapted for position detection based on the individual magnetostriction propagating media. The number of parts may be correspondingly reduced, making a cost-efficient position detector available.

Additionally, the feature of the present invention that the spacing between the magnetostriction propagating media belonging to the same pair is dimensioned larger than that between the magnetostriction propagating media which are adjacent each other but belong to different pairs, makes it possible to minimize malfunctioning and thereby makes it possible to reduce the number of magnetostriction propagating media with respect to the position detector comprising the magnetostriction propagating media arranged at regular intervals. In this manner, this feature also provides a cost-efficient position detector.

The embodiments of the invention in which an exclusive property or privilege is claimed are defined as follows.

1. A position detector comprising:
   a plurality of magnetostriction propagating media extending substantially in parallel with one another;
   first coils wound around said plurality of magnetostriction propagating media at respective one ends thereof, said one ends defining first regions of said media;
   second coils wound around said plurality of magnetostriction propagating media over respective extents thereof;
   position indicator means for generating steady magnetic fields located at detected positions of said respective extents defining second regions of said media;
   means for applying a current pulse to one of said first coils or second coils to generate magnetostrictive oscillation waves in the corresponding one of said regions of the associated magnetostriction propagating media;
   measuring means for measuring the time lapse between the point in time at which said magnetostrictive oscillation wave is generated and the point in time at which said magnetostrictive oscillation wave reaches the other one of said regions after propagation through said media;
   processing means responsive to said determined time lapse for determining said positions of said position indicator means; and
   wherein adjacent two of said plurality of magnetostriction media are respectively paired, said respective pairs of magnetostriction propagating media being individually wound with said first coils and said second coils so as to simultaneously generate said magnetostrictive oscillation waves in said respective pairs.

2. A position detector as recited in claim 1, wherein said plurality of magnetostriction media are arranged at regular intervals.

3. A position detector as recited in claim 1, wherein each of said paired magnetostriction propagating media is spaced from the adjacent paired magnetostriction propagating media by an interval smaller than that by which the individual magnetostriction propagating media of the respective pairs are spaced from each other.

4. A position detector as recited in claim 1, wherein said first coils have a plurality of turns.

5. A position detector as recited in claim 1, wherein said first coils are crossed at their turn terminals associated with the respective magnetostriction propagating media so that the electric current flowing through said first coils are reversed in its direction at said turn terminals between the portions of said first coils wound around the respective magnetostriction propagating media and the remaining portions thereof.

6. A position detector as recited in claim 1, wherein said plurality of magnetostriction propagating media are divided into a plurality of groups and the adjacent magnetostriction propagating media are respectively paired within each of said groups.

7. A position detector as recited in claim 1, wherein said plurality of magnetostriction propagating media are arranged in a single orientation so as to detect one-dimensional position.

8. A position detector as recited in claim 1, wherein said plurality of magnetostriction propagating media are arranged in orthogonal two directions so as to detect two-dimensional position.

* * * * *

UNITED STATES PATENT AND TRADEMARK OFFICE
CERTIFICATE OF CORRECTION

PATENT NO. : 4,832,144

DATED : May 23, 1989

INVENTOR(S) : AZUMA MURAKAMI ET AL.

It is certified that error appears in the above-identified patent and that said Letters Patent is hereby corrected as shown below:

TITLE PAGE:

Abstract, line 16:

"magnetotriction" should be --magnetostriction--.

Abstract, lines 22 and 23:

"magnetositriction" should be --magnetostriction--.

Column 2, line 38:

"12" should be --$1_2$--.

Column 4, line 24:

"provide" should be --provided--.

Column 4, line 33:

"lane" should be --plane--.

Column 6, line 24:

"a" should be --an--.

Column 7, line 34:

"n" should be --on--.

Column 9, line 17:

"tee" should be --the--.

UNITED STATES PATENT AND TRADEMARK OFFICE
CERTIFICATE OF CORRECTION

Page 2 of 2

PATENT NO. : 4,832,144
DATED : May 23, 1989
INVENTOR(S) : AZUMA MURAKAMI ET AL.

It is certified that error appears in the above-identified patent and that said Letters Patent is hereby corrected as shown below:

Column 11, line 2:

"i" should be --is--.

Column 11, line 31:

"11i $xa_1$" should be --11$xa_1$--.

Column 11, line 37:

"11$xb_2$" should be --11$xa_2$--.

Signed and Sealed this

Seventh Day of May, 1991

Attest:

HARRY F. MANBECK, JR.

Attesting Officer

Commissioner of Patents and Trademarks